United States Patent
Fukano et al.

(10) Patent No.: US 8,720,318 B2
(45) Date of Patent: May 13, 2014

(54) ACTUATOR

(75) Inventors: Yoshihiro Fukano, Moriya (JP); Toru Sugiyama, Abiko (JP); Masaki Miyahara, Moriya (JP)

(73) Assignee: SMC Kabushiki Kaisha, Tokyo (JP)

( * ) Notice: Subject to any disclaimer, the term of this patent is extended or adjusted under 35 U.S.C. 154(b) by 820 days.

(21) Appl. No.: 12/913,288

(22) Filed: Oct. 27, 2010

(65) Prior Publication Data

US 2011/0113955 A1    May 19, 2011

(30) Foreign Application Priority Data

Nov. 13, 2009 (JP) ................................. 2009-259439

(51) Int. Cl.
*F16J 15/18* (2006.01)

(52) U.S. Cl.
USPC ............................................. 92/167; 92/168

(58) Field of Classification Search
USPC ............... 74/89.23; 92/167, 168, 165 PR, 88
See application file for complete search history.

(56) References Cited

U.S. PATENT DOCUMENTS

| 4,736,675 A * | 4/1988 | Stoll ................................. 92/13 |
| 5,305,683 A * | 4/1994 | Gosdowski et al. ............ 92/5 R |
| 5,560,281 A * | 10/1996 | Schneid ............................ 92/61 |
| 2007/0062317 A1 * | 3/2007 | Nagai et al. ...................... 74/89 |

FOREIGN PATENT DOCUMENTS

| JP | 7-110005 A | 4/1995 |
| JP | 2007-32596 A | 2/2007 |
| JP | 2007-89275 | 4/2007 |
| JP | 2009-118732 A | 5/2009 |

OTHER PUBLICATIONS

Japanese Office Action issued Jun. 25, 2013 in Patent Application No. 2009-259439 with Partial English Translation.

* cited by examiner

*Primary Examiner* — Edward Look
*Assistant Examiner* — Logan Kraft
(74) *Attorney, Agent, or Firm* — Oblon, Spivak, McClelland, Maier & Neustadt, L.L.P.

(57) ABSTRACT

An actuator is equipped with a cylinder body in the interior of which a piston is disposed for displacement therein. A piston rod connected to the piston projects outwardly to the exterior from an end of the cylinder body. A guide unit, having a guide body that is attached to the cylinder body, and a pair of guide rods, which are disposed displaceably with respect to the guide body, are disposed detachably on the cylinder body. Additionally, by mutually interconnecting the guide rods of the guide unit and the piston rod through a connecting plate, when the piston rod is displaced in an axial direction, the piston rod is guided by the pair of guide rods.

7 Claims, 10 Drawing Sheets

ACTUATOR

CROSS-REFERENCE TO RELATED APPLICATION

This application is based upon and claims the benefit of priority from Japanese Patent Application No. 2009-259439 filed on Nov. 13, 2009, of which the contents are incorporated herein by reference.

BACKGROUND OF THE INVENTION

1. Field of the Invention

The present invention relates to an actuator in which, by transmitting a drive force from a driving section to a displaceable body, the displaceable body is displaced through a given stroke.

2. Description of the Related Art

Heretofore, as a means for transporting a workpiece or the like, for example, there has widely been used an actuator in which a feed screw is rotatably driven by a rotary drive force of a rotary drive source such as a motor or the like, thereby causing a slider to be displaced so as to transport the workpiece.

The present assignee, as disclosed in Japanese Laid-Open Patent Publication No. 2007-089275, has proposed an actuator equipped with a drive source such as a motor or the like, a transmission mechanism disposed inside a main body casing connected to the drive source and by which a drive force from the drive source is transmitted, and a displacement mechanism, which is connected to the casing, to which the drive force from the transmission mechanism is transmitted to displace the displacement mechanism through a given stroke.

SUMMARY OF THE INVENTION

A principal object of the present invention is to provide an actuator, which is capable of displacing a displaceable body stably along an axial direction by disposing a guide mechanism in a detachable manner, which enables a guide mechanism to be selected that is optimized corresponding to the size of a demanded load. Furthermore, in accordance with such a structure, the strength and rigidity of the actuator can be improved.

The present invention is characterized by a body, a displacement mechanism having a displaceable body, which is disposed in the body for displacement along an axial direction of the body, and a guide mechanism having a main body portion attached to the body, a guide shaft, which is disposed substantially in parallel with the displaceable body, and which is supported displaceably along the axial direction with respect to the main body portion, and a connecting member that interconnects the guide shaft and the displaceable body, wherein the guide mechanism is disposed detachably with respect to the body.

In accordance with the present invention, the guide mechanism, including the main body portion, the guide shafts, which are supported displaceably along the axial direction with respect to the main body portion, and the connecting member that interconnects the guide shafts and the displaceable body, is disposed detachably with respect to the body that is equipped with the displacement mechanism. Additionally, when the displaceable body that makes up the displacement mechanism is displaced along the axial direction of the body, the displaceable body is displaced together with the guide shafts, which are connected thereto via the connecting member, whereby the displaceable body is guided along the axial direction.

Accordingly, by installing the guide mechanism with respect to the body, the displaceable body can be displaced in a stable manner along the axial direction under a guiding action of the guide shafts that constitute the guide mechanism, and together therewith, sufficient rigidity can be obtained with respect to loads that are applied to the displaceable body in a direction perpendicular to the axial direction.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
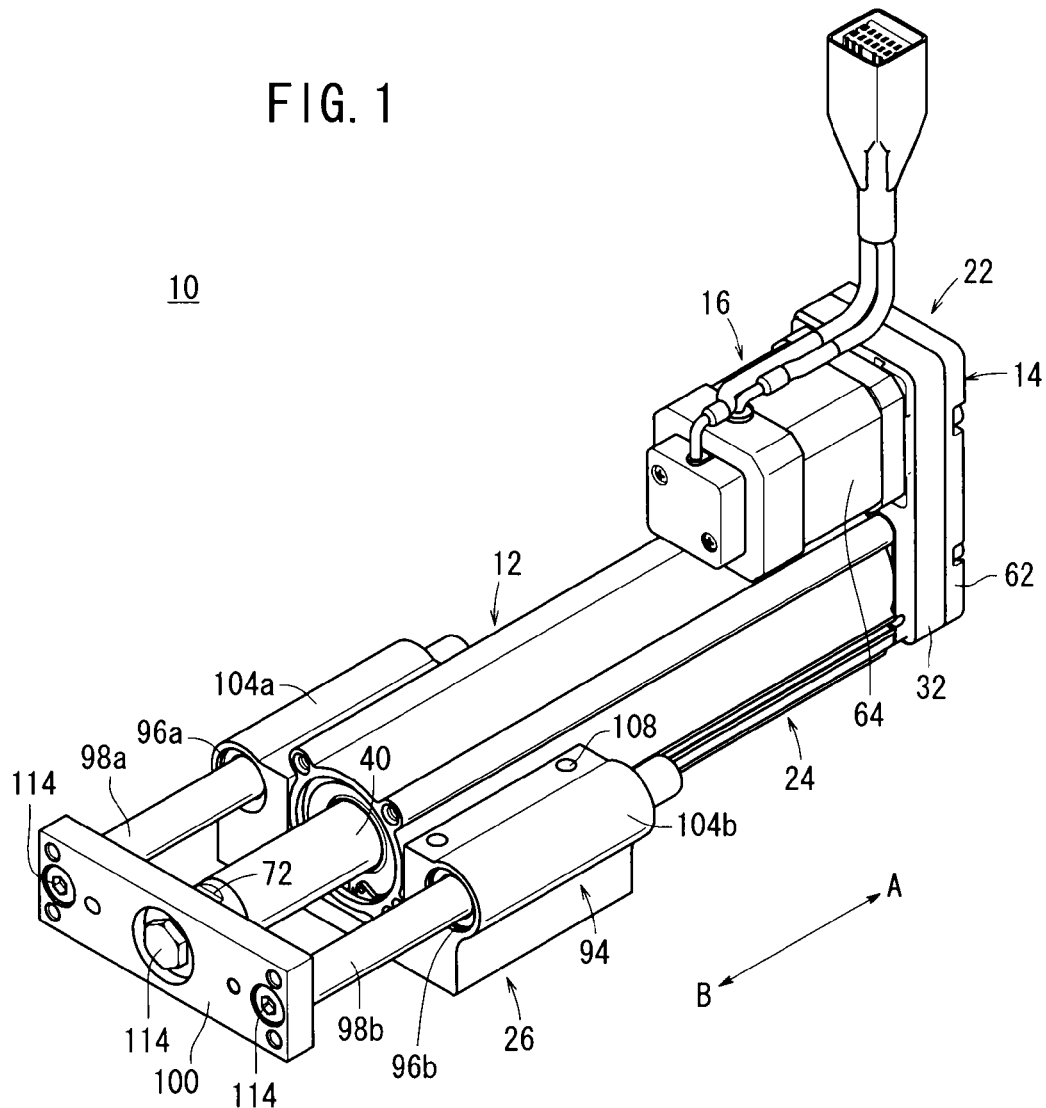
FIG. 1 is an exterior perspective view showing an actuator according to a first embodiment of the present invention.

As shown in FIGS. 1 through 4, a linear actuator 10 according to a first embodiment of the present invention includes a cylinder body (body) 12 with a longitudinal dimension extending in the axial direction (in the direction of arrows A and B), a cover unit 14 connected to one end of the cylinder body 12, a driving section 16 driven rotatably by an electrical signal and which is disposed substantially in parallel with the cylinder body 12, a displacement mechanism 20 disposed in the interior of the cylinder body 12, having a displacement nut 18 that is capable of being displaced through a given stroke by a drive force from the driving section 16, a drive unit 24 equipped with a drive force transmission mechanism (transmission mechanism) 22 that transmits a drive force from the driving section 16 to the displacement mechanism 20, and a guide unit (guide mechanism) 26 attached to an end of the cylinder body 12 constituting the drive unit 24, and which guides the displacement mechanism 20 along the axial direction.

More specifically, the aforementioned drive unit 24 forms an electric actuator, which is capable of displacing the displacement mechanism 20 upon supply of electrical energy to the driving section 16.

In the cylinder body 12, a hole 28, which opens with a substantially circular shape in cross section, penetrates through the cylinder body 12 in the axial direction (in the direction of arrows A and B). On one end of the cylinder body 12, a housing 30 is screw-engaged, and together therewith, an adapter 32 of the cover unit 14 is provided, which interconnects the cylinder body 12 and the driving section 16 through the housing 30. In the interior of the housing 30, a pair of first bearings 34 are arranged in parallel, which are held in place by a bearing holder 54.

On the other hand, in the other end of the cylinder body 12, a cylindrical shaped rod cover 36 is accommodated in the interior of the hole 28. The rod cover 36 is latched and held in place in the axial direction (in the direction of arrows A and B) by a stop ring 38, in a state of being engaged with a step of the hole 28. A rod packing 42 and a bush 44, with respect to which a later mentioned piston rod (displaceable body) 40 is capable of sliding in contact therewith, are disposed on an inner circumferential surface of the rod cover 36. Together therewith, on an end surface of the rod cover 36, a damper made from an elastic material (e.g., rubber, urethane) is installed so as to face toward one end side of the cylinder body 12.

Further, on the other end of the cylinder body 12, when a later-described guide unit 26 is attached thereto, a pair of pin holes 48 in which positioning pins 46 are inserted, and two pairs of screw holes 50a, 50b, which are separated a predetermined distance in the longitudinal direction of the body centrally about the pin holes 48, are formed respectively on a bottom wall of the cylinder body 12. The screw holes 50a, 50b are for screw-engagement with later-described attachment bolts 52a, 52b.

On the other hand, on an inner circumferential surface of the hole 28, a groove 56 (see FIG. 6) is formed, which extends along the axial direction (in the direction of arrows A and B) and is recessed in a radial outward direction. A rotation-stopping member 60, which is disposed on a later-described piston 58 of the displacement mechanism 20, is inserted into the groove 56.

The cover unit 14 is connected to one end of the cylinder body 12 and to an end portion of the driving section 16, and further includes an adapter 32 in the interior of which the drive force transmission mechanism 22 is accommodated, and a pulley cover 62 that is fitted to and closes an open region of the adapter 32. More specifically, the cylinder body 12 and the driving section 16 are connected together mutually substantially in parallel through the cover unit 14.

The driving section 16 is made up from a rotary drive source 64 such as, for example, a DC motor, a stepping motor or the like, which is driven rotatably by an electrical current that is supplied through a power source cable from a non-illustrated power source. The driving section 16 is connected to one end of the cylinder body 12 through the adapter 32, which is formed on the end of the driving section 16, and a drive pulley 68 of the drive force transmission mechanism 22 is mounted on a drive shaft 66 of the rotary drive source 64.

The displacement mechanism 20 includes a screw shaft 70 accommodated in the interior of the cylinder body 12, the displacement nut 18 that is screw-engaged with the screw shaft 70, a piston 58 installed on an outer circumferential side of the displacement nut 18, a piston rod 40 connected to an end of the piston 58, and a socket 72 that is fitted into and closes an end of the piston rod 40.

The screw shaft 70 has threads engraved therein on the outer circumferential side thereof, which are formed longitudinally along the axial direction (in the direction of arrows A and B) of the screw shaft 70. One end of the screw shaft 70 is disposed on one end side (in the direction of the arrow A) of the cylinder body 12, and a connector 74 is connected to the one end of the screw shaft 70.

An outer circumferential surface of the connector 74 is retained rotatably by the first and second bearings 34, 76. Further, a driven pulley 78 constituting part of the drive force transmission mechanism 22 is screw-engaged with and connected to the end of the connector 74. More specifically, the one end of the screw shaft 70 is retained in a rotatable condition by the first and second bearings 34, 76 through the connector 74.

On the other hand, the other end side (in the direction of the arrow B) of the screw shaft 70 is inserted into the interior of the piston rod 40, and an annular support ring 82 is disposed on the other end of the screw shaft 70 through a holder 80.

The displacement nut 18 is formed in a cylindrical shape and has a screw hole (not shown) along the axial direction in a central portion thereof. The screw shaft 70 is screw-engaged with respect to the non-illustrated screw hole. Additionally, under a rotary action of the screw shaft 70, the interior of the cylinder body 12 is displaced along the axial direction (in the direction of arrows A and B).

The piston 58 is formed in a cylindrical shape, with the displacement nut 18 being accommodated and connected in the interior thereof, and one end of the piston 58 is connected with respect to the piston rod 40. Further, a magnet 84 is installed through an annular groove on the outer circumferential side of the piston 58. Magnetism from the magnet 84 is detected by a position-detecting sensor (not shown), which is installed on an outer side of the cylinder body 12, whereby the position of the piston 58 in the actuator 10 is confirmed.

The rotation-stopping member 60 has projecting parts (not shown) that project in a radial outward direction from the outer circumferential side thereof. By insertion of the rotation-stopping member 60 together with the piston 58 into the interior of the cylinder body 12, the projecting parts are inserted respectively into the groove 56. Consequently, the piston 58 and the displacement nut 18 including the rotation-stopping member 60 are prevented from displacement in a direction of rotation within the cylinder body 12.

The piston rod 40 is formed in a cylindrical tubular shape having a predetermined length. One end thereof is screw-engaged with the piston 58, whereas the socket 72 is fitted into the other end to close the same. Further, the screw shaft 70 is accommodated in the interior of the piston rod 40, such that the support ring 82 is in slidable contact with the inner circumferential surface, and the rod packing 42 and the bush 44 are in slidable contact with the outer circumferential surface of the piston rod 40.

Additionally, the piston rod 40 is disposed such that, under a displacement action of the piston 58, the piston rod 40 is displaced in the axial direction together with the piston 58, so as to be capable of projecting to the exterior from the other end side (in the direction of the arrow B) of the cylinder body 12.

Figure 3:
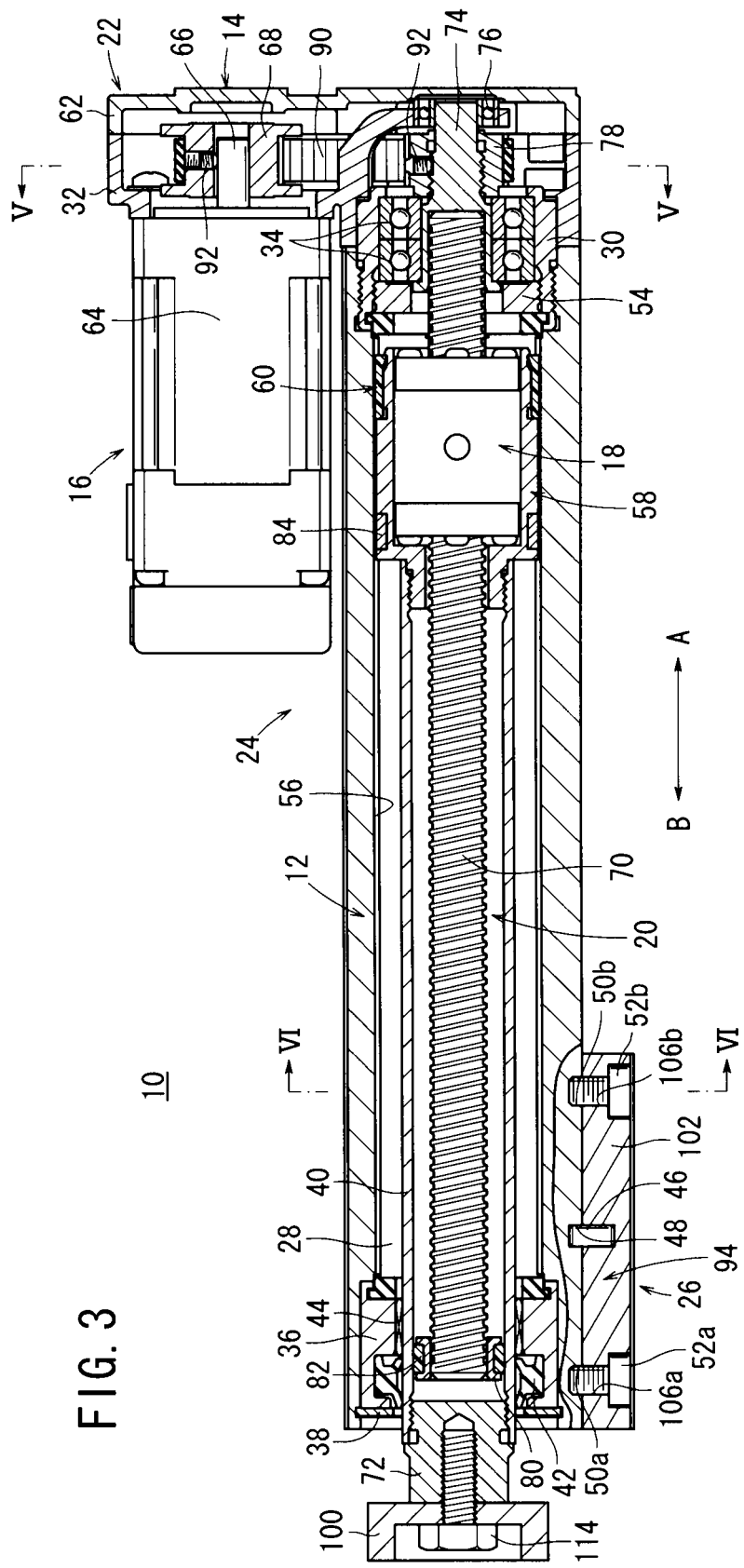
FIG. 3 is an overall vertical cross sectional view of the actuator shown in FIG. 1.
Figure 4:
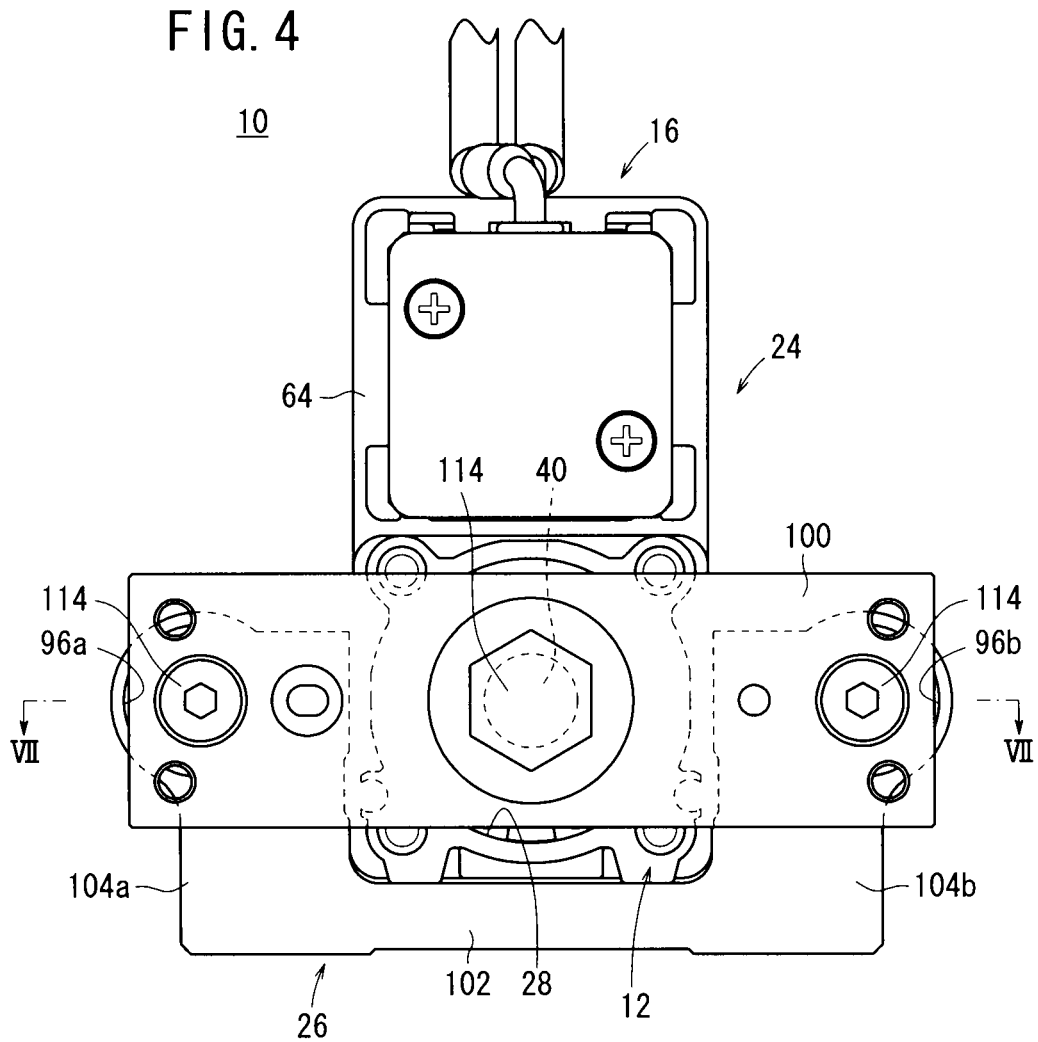
FIG. 4 is a front view of the actuator.
Figure 5:
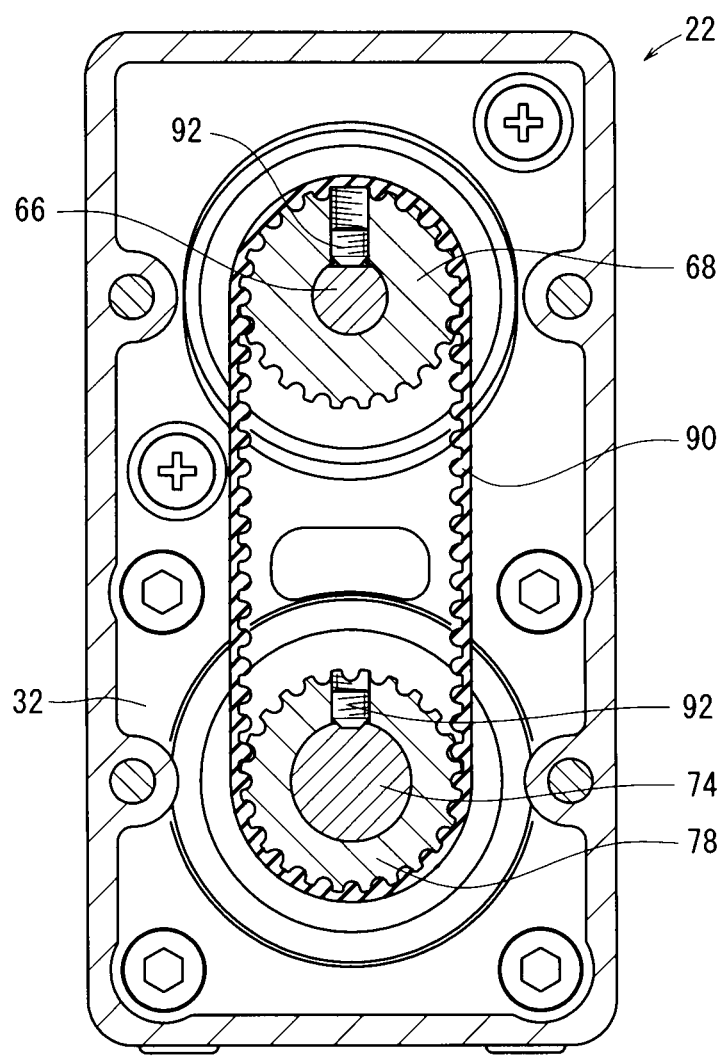
FIG. 5 is a cross sectional view taken along line V-V of FIG. 3.

As shown in FIGS. 1, 3 and 5, the drive force transmission mechanism 22 includes a drive pulley 68, which is accommodated in the interior of the adapter 32 and the pulley cover 62, and is connected to the drive shaft 66 of the rotary drive source 64, a driven pulley 78 in which the connector 74 connected to the screw shaft 70 is installed, and a timing belt 90, which is trained around and extends over both the drive pulley 68 and the driven pulley 78.

Further, the drive pulley 68 is fixed in a state of being restricted against relative displacement with the drive shaft 66 by a screw-engaged bolt pin 92 that faces in a central direction from the outer circumferential side, and similarly, the driven pulley 78 is fixed in a state of being restricted against relative displacement with the connector 74 by a screw-engaged bolt pin 92 that faces in a central direction from the outer circumferential side.

In addition, a plurality of gear teeth are provided on the outer circumferential sides of the drive pulley 68 and the driven pulley 78, which are enmeshed with gear teeth provided on the inner circumferential surface of the timing belt 90. Owing thereto, a rotary drive force of the driving section 16 is transmitted from the drive pulley 68 to the driven pulley 78 via the timing belt 90, which causes the screw shaft 70 to be rotated, and together therewith, the displacement nut 18, which is screw-engaged with the screw shaft 70, is capable of being displaced along the axial direction (in the direction of arrows A and B).

The guide unit 26 includes a guide body (main body portion) 94, which is formed with a U-shape in cross section, a pair of guide rods (guide shafts) 98a, 98b that are inserted through a pair of rod holes (support holes) 96a, 96b provided in the guide body 94, and a connecting plate (connecting member) 100, which interconnects the guide rods 98a, 98b and the piston rod 40.

The guide body 94 is made up from a base portion 102, which is formed, for example, from a metallic material such as an aluminum alloy or the like and in which the cylinder body 12 that constitutes the drive unit 24 is installed, and a pair of guide portions 104a, 104b, which are erected in the vertical direction from opposite sides of the base portion 102.

The base portion 102 is formed in a plate-like shape having a constant thickness, and further is formed with a predetermined length along the axial direction (in the direction of arrows A and B) of the cylinder body 12, and is formed slightly larger in a widthwise direction with respect to the width dimension of the cylinder body 12. In addition, a pair of positioning pins 46 are installed roughly in the center thereof along the longitudinal direction (the direction of arrows A and B) of the base portion 102, the positioning pins 46 projecting a predetermined height from the upper surface of the base portion 102. Further, two pairs of bolt holes 106a, 106b, which are separated a predetermined distance from the positioning pins 46, are formed on the base portion 102. Attachment bolts 52a, 52b, which serve to interconnect the guide unit 26 and the cylinder body 12, are inserted respectively through the bolt holes 106a, 106b. Further, the bolt holes 106a, 106b are formed respectively on one end side (in the direction of the arrow A) and the other end side (in the direction of the arrow B) of the base portion 102 with respect to the positioning pins 46, and further, are formed in parallel in the widthwise direction of the base portion 102.

The guide portions 104a, 104b are joined to opposite end sides of the base portion 102 and are formed at a predetermined height with respect to the base portion 102. Additionally, when the cylinder body 12 is installed onto the base portion 102, interior side walls of the guide portions 104a, 104b face toward the cylinder body 12 and are formed so as to be spaced slightly with respect to side surfaces of the cylinder body 12.

Further, in the guide portions 104a, 104b, rod holes 96a, 96b penetrate respectively therethrough along the longitudinal direction of the guide body 94, and more specifically, along the axial direction of the cylinder body 12, and together therewith, when the cylinder body 12 is installed on the base portion 102, the guide portions 104a, 104b are disposed at a position that is substantially the same as the height of the piston rod 40.

Furthermore, on the guide portions 104a, 104b, two pairs of penetrating holes 108 are formed so as to be perpendicular to the rod holes 96a, 96b, and to penetrate respectively in a downward direction from upper surfaces of the guide portions 104a, 104b.

Figure 6:
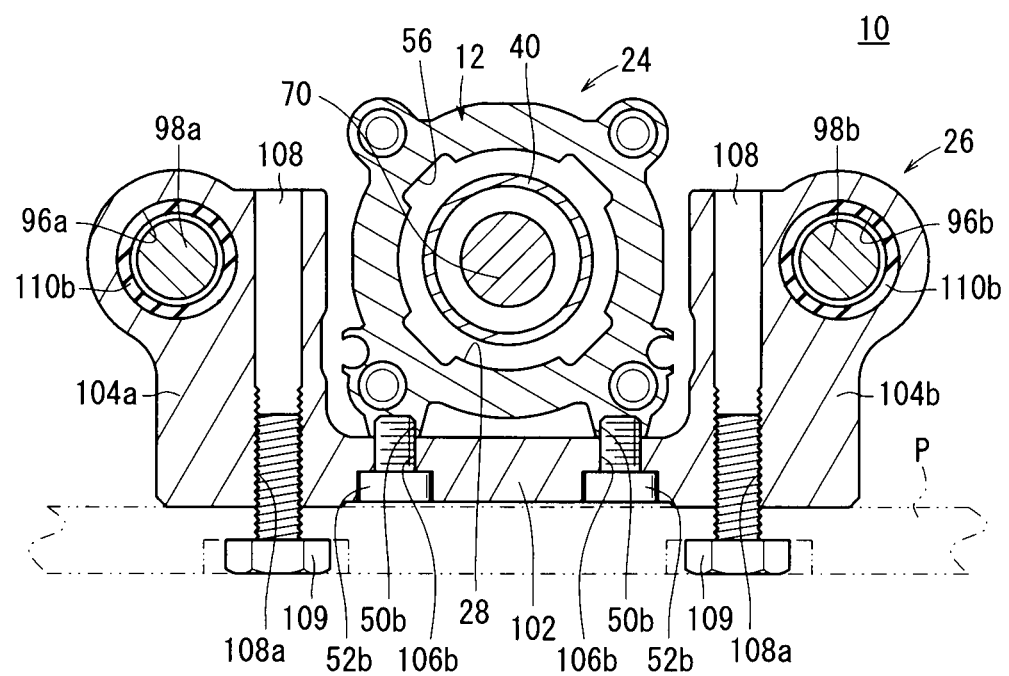
FIG. 6 is a cross sectional view taken along line VI-VI of FIG. 3.

As shown in FIG. 6, penetrating holes 108 are formed respectively in the one guide portion 104a and in the other guide portion 104b, with the base portion 102 residing therebetween. Threaded portions 108a are formed on inner circumferential surfaces on the lower sides thereof. In addition, for example, by arranging the guide unit 26 on another material P of a plate-like shape, and by insertion and screw-engagement of tightening bolts (tightening members) 109 in the penetrating holes 108, with the other material P intervening therebetween, the guide unit 26 is secured with respect to the other material P.

Moreover, the guide unit 26 may also be secured with respect to the other material P by insertion of the tightening bolts 109 from above with respect to the penetrating holes 108, and by screw-engagement of the tightening bolts 109 in screw holes formed in the other material P.

A pair of rod bushes 110a, 110b are disposed respectively in the rod holes 96a, 96b, in the vicinity of opened opposite end portions thereof, and annular packings 112 are installed on one end side that forms a later-described connecting plate 100 side thereof. In addition, when the guide rods 98a, 98b are inserted into the interior of the rod holes 96a, 96b, the guide rods 98a, 98b are supported by the pair of rod bushes 110a, 110b for displacement along the axial direction (in the direction of arrows A and B), and together therewith, as a result of the packings 112 being in slidable contact with outer circumferential surfaces of the guide rods 98a, 98b, adherence of dust and debris and the like on such outer circumferential surfaces is eliminated. The rod bushes 110a, 110b may be formed, for example, from slide bearings, ball bush bearings or the like.

Further, in the case that the length in the axial direction of the rod holes 96a, 96b is short, the pair of rod bushes 110a, 110b need not be provided, but rather, in this case, only a single rod bush may be provided.

The guide rods 98a, 98b are made up from shafts having a constant radius, such that when the guide rods 98a, 98b are inserted through the rod holes 96a, 96b, both end sides thereof are disposed so as to project outwardly from the rod holes 96a, 96b.

The longitudinal dimension of the guide rods 98a, 98b is set to a length such that, when the piston rod 40 is displaced along the axial direction, the guide rods 98a, 98b are capable of being supported at all times by the pair of rod bushes 110a, 110b. In addition, the connecting plate 100 is connected through connecting bolts 114 to ends of the guide rods 98a, 98b.

The connecting plate 100 is formed with a rectangular shape in cross section, the lengthwise dimension of which is oriented horizontally. By means of a connecting bolt 114 inserted substantially through the center thereof, the socket 72, which is mounted on the piston rod 40, is connected to the connecting plate 100. On the other hand, in the vicinity of opposite end portions of the connecting plate 100, the two guide rods 98a, 98b are separated an equal distance centrally about the piston rod 40, and are connected respectively to the connecting plate 100 by connecting bolts 114. Moreover, the pair of guide rods 98a, 98b and the piston rod 40 are arranged via the connecting plate 100 along straight lines in a substantially horizontal direction.

Owing thereto, the two guide rods 98a, 98b are displaced integrally and in unison with the piston rod 40 via the connecting plate 100.

The actuator according to the first embodiment of the present invention is constructed basically as described above. Next, a case shall be explained in which the guide unit 26 is installed with respect to the cylinder body 12.

At first, for example, the guide body 94 of the guide unit 26 is placed on a floor surface or the like so that the guide portions 104a, 104b thereof are oriented upwardly, and the drive unit 24 is moved into proximity from above with respect to the guide unit 26, and is placed on the base portion 102 while being inserted between one of the guide portions 104a and the other of the guide portions 104b. The bottom wall side of the cylinder body 12 having the pin holes 48 is positioned downwardly, or more specifically, so as to face toward the side of the guide unit 26, with respect to the base portion 102.

Additionally, by insertion of the positioning pins 46 provided on the base portion 102 respectively in the pin holes 48 of the cylinder body 12, the drive unit 24 and the guide unit 26 are positioned relatively to each other, and thereafter, by insertion of the attachment bolts 52a, 52b from underneath through the bolt holes 106a, 106b and by screw-engagement thereof respectively into the screw holes 50a, 50b, the guide unit 26 is connected with respect to the drive unit 24 in a properly positioned state (see FIG. 3).

At this time, the pair of guide rods 98a, 98b provided on the guide unit 26 and the piston rod 40 provided on the cylinder body 12 are arranged so that positions thereof in the height direction are substantially in agreement with each other, and installation is carried out so that positions of the end of the cylinder body 12 and the end of the guide body 94 are substantially in agreement with each other.

Figure 7:
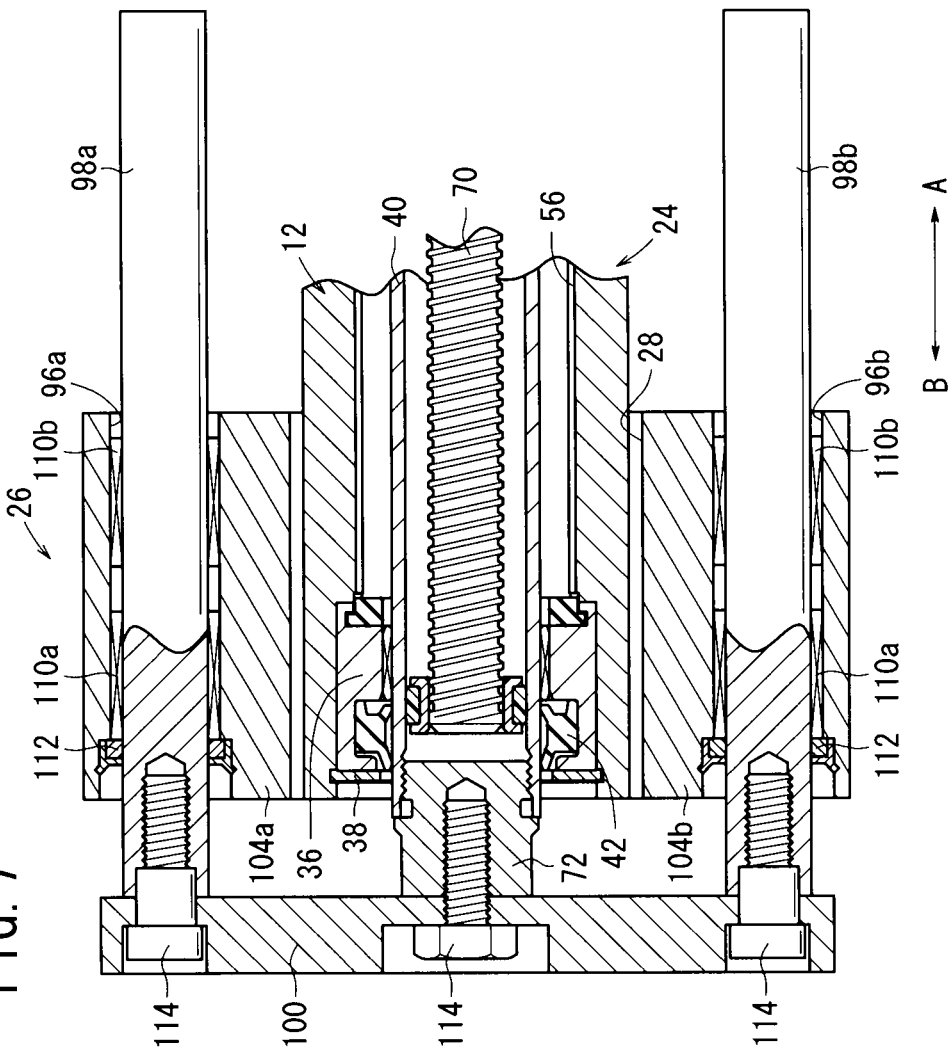
FIG. 7 is a cross sectional view taken along line VII-VII of FIG. 4.

Next, the connecting plate 100 is connected via the connecting bolt 114 with respect to the socket 72 provided on the end of the piston rod 40, and together therewith, respective ends of the pair of guide rods 98a, 98b are connected by connecting bolts 114 in the vicinity of opposite end portions of the connecting plate 100 (see FIG. 7). Owing thereto, the piston rod 40 and the guide rods 98a, 98b are connected integrally by the connecting plate 100, and positions of end portions thereof are connected so as to match with the axial direction of the cylinder body 12. As a result, the guide unit 26 is mounted integrally on the other end side (in the direction of the arrow B) of the cylinder body 12.

In this manner, after the guide unit 26 has been positioned by the pair of positioning pins 46 on the bottom side of the drive unit 24, the two pairs of attachment bolts 52a, 52b, which are inserted through the base portion 102, are screw-engaged respectively with respect to the cylinder body 12, whereby the guide unit 26 can easily be installed with respect to the cylinder body 12 of the drive unit 24, and together therewith, the pair of guide rods 98a, 98b that constitute the guide unit 26 and the piston rod 40 of the actuator 10 can easily be interconnected by the connecting plate 100.

More specifically, as needed, a desired guide unit 26 is capable of being attached easily with respect to an actuator that does not have a guide mechanism. Consequently, when the actuator 10 is driven, the displacement stroke of the piston rod 40 thereof is guided by the guide unit 26, so that such displacement can be carried out smoothly and in a stable manner, and together therewith, strength and rigidity can be enhanced by means of the guide rods 98a, 98b and the connecting plate 100, which is connected to the piston rod 40.

Figure 2:
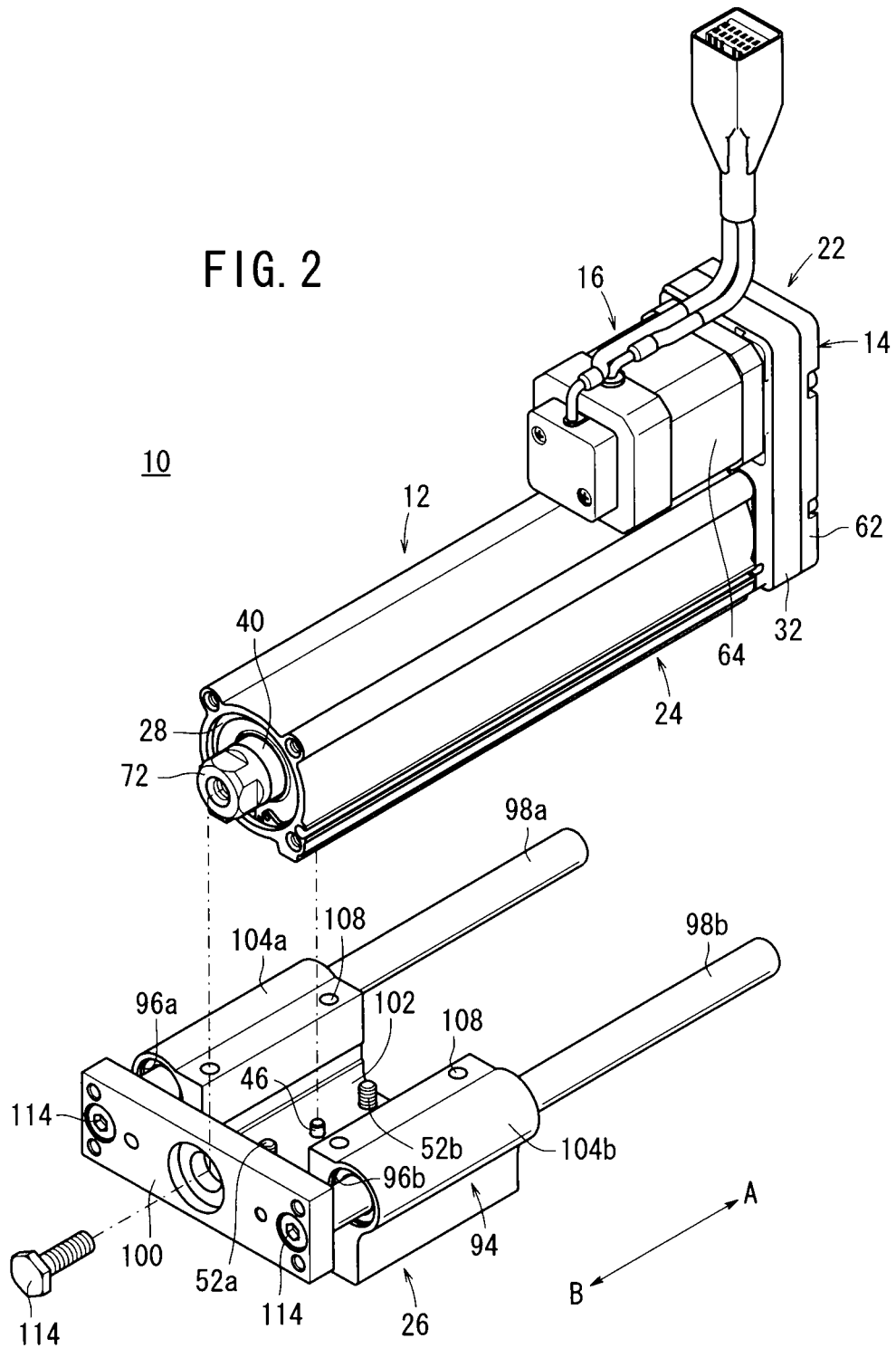
FIG. 2 is an exploded perspective view showing a condition in which a guide unit is detached and separated from the actuator of FIG. 1.

Next, an explanation shall be made concerning operations and advantageous effects of the actuator 10 on which the aforementioned guide unit 26 is installed. As shown in FIG. 2, such descriptions are made with reference to a state in which the piston rod 40 is accommodated in the interior of the body, as an initial position thereof.

In such an initial position, by supplying an electrical current with respect to the driving section 16 from a non-illustrated power source, the drive pulley 68 is driven rotatably via the drive shaft 66 of the rotary drive source 64, and a rotary drive force thereof is transmitted to the driven pulley 78 through the timing belt 90.

In addition, the screw shaft 70 connected to the driven pulley 78 is rotated, whereby the piston 58 is displaced together with the displacement nut 18 toward the other end side (in the direction of the arrow B) of the cylinder body 12.

Further, because the rotation-stopping member 60 that is installed on the piston 58 is inserted into the groove 56 of the cylinder body 12 via the projection thereof, rotational displacement of the piston 58 and the displacement nut 18 is restricted, such that the piston 58 and the displacement nut 18 can be displaced only along the axial direction.

Owing thereto, the piston rod 40 is displaced together with the piston 58, and the other end side (in the direction of the arrow B) of the piston rod 40 gradually projects so as to become exposed to the exterior from the other end of the cylinder body 12. Together therewith, the connecting plate 100, which is connected to the piston rod 40, and the pair of guide rods 98a, 98b, which also are connected to the connecting plate 100, are displaced integrally and in unison in the direction of the arrow B.

At this time, because the piston rod 40 is guided in a straight line (in the direction of the arrow B) by means of the pair of guide rods 98a, 98b, which are disposed in parallel in the horizontal direction, displacement can be carried out with high precision while the piston rod 40 is maintained in a stable condition. Further, at the same time, because the piston rod 40 is connected mutually with the guide rods 98a, 98b via the connecting plate 100, strength and rigidity thereof can be enhanced, and displacement can be carried out with greater stability. In addition, for example, when movement or stoppage of movement of a workpiece or the like having a heavy weight is performed by the displacement force of the piston rod 40, since rigidity is enhanced, bending or warping of the piston rod 40 can be avoided, and the workpiece is capable of being displaced in a desired direction, or such displacement can be stopped.

In addition, in a displacement terminal end position in which the piston 58 has been displaced to the other end side of the cylinder body 12, by abutment of an end surface of the piston 58 against the damper, shocks applied to the piston 58 are absorbed and buffered.

On the other hand, in the case that the piston rod 40 is displaced to one end side (in the direction of the arrow A) of the cylinder body 12, the rotary drive source 64 constituting the driving section 16 is driven rotatably in an opposite direction, and by rotation in opposite directions of the drive pulley 68 and the driven pulley 78 via the timing belt 90, upon rotation of the screw shaft 70, the displacement nut 18 and the piston 58 are displaced to the one end side (in the direction of the arrow A) of the cylinder body 12, accompanied by displacement of the piston rod 40 in the same manner toward the one end side (in the direction of the arrow A) of the cylinder body 12.

Similarly, in this case as well, because the piston rod 40 is connected via the connecting plate 100 to the pair of guide rods 98a, 98b, the guide rods 98a, 98b are displaced along the rod holes 96a, 96b, whereby the piston rod 40 can be displaced in a stable manner along the axial direction. Additionally, as the piston rod 40 becomes accommodated gradually in the interior of the cylinder body 12, the displacement nut 18 and the piston 58 are displaced to the one end side of the cylinder body 12 and are restored to their initial positions (see FIG. 3).

In the foregoing manner, with the first embodiment, the guide unit 26 equipped with the pair of guide rods 98a, 98b is disposed detachably with respect to the drive unit 24 in the actuator 10, and by connecting the connecting plate 100, to which the guide rods 98a, 98b are connected, to an end of the piston rod 40 that makes up the drive unit 24, the guide rods 98a, 98b can be displaced together with the piston rod 40. As a result, the drive unit 24 including the piston rod 40 is capable of being displaced stably through a given stroke, and in addition, sufficient strength and rigidity can be obtained with respect to loads that are applied with respect to the piston rod 40 in a direction (lateral direction) perpendicular to the axis of the piston rod 40.

Further, because the guide unit 26 can easily be detached from the drive unit 24, for example, when the size (demanded load) of the workpiece, which is transported or stopped by the actuator 10, is changed, by exchanging the guide unit 26 with another guide unit 26, which corresponds to the size of the workpiece, a guiding capability and a stopping capability, which are responsive to the size of the workpiece, can reliably and easily be obtained.

Stated otherwise, in the actuator according to the conventional art, in the event that the size of the workpiece, which is to be transported or stopped, is changed, it has been necessary to prepare a different actuator having a guiding capability and a stopping capability corresponding to the size of the workpiece. However, with the present invention, without preparing a separate actuator, the same actuator 10 can be used, and it is sufficient only to exchange the guide unit 26 that is attached with respect to the actuator 10.

As a result, by exchanging and converting to a guide unit 26 that corresponds to the demanded load (transporting ability and stopping ability), because an actuator can be used which is always optimal, for each case, equipment costs can be reduced compared to the case of preparing a separate actuator. Further, by using a guide unit 26 that has an optimal guiding capability, unnecessary increases in size of the guide unit 26 can be avoided, such that a reduced size and lightweight condition of the actuator 10 can be promoted.

Furthermore, because the drive unit 24, including the piston 58 and the piston rod 40, and the guide unit 26 for guiding the stroke displacement of the piston rod 40 are constructed separately, the lengthwise dimension of the guide body 94 constituting the guide unit 26 can be set to a length that corresponds with the length of the rod holes 96a, 96b that are needed to guide the guide rods 98a, 98b. Owing thereto, compared to an actuator in which the guide mechanism including the guide rods is formed integrally with the drive unit, the lengthwise dimension of the guide unit 26 can be made smaller. As a result, accompanying such minimization in the size and weight of the guide unit 26, the actuator 10 as a whole can be made smaller in size and lighter in weight, and at the same time, manufacturing costs for the actuator 10 can be reduced.

Still further, by switching to a different guide unit 26, which is equipped with rod holes 96a, 96b the lengthwise dimension of which has changed, and guide rods 98a, 98b the lengthwise dimension of which corresponds to the rod holes 96a, 96b, the guiding capability of the piston rod 40 by the guide unit 26 is capable of being adjusted. More specifically, by increasing the lengthwise dimension of the rod holes 96a, 96b and the guide rods 98a, 98b, when the piston rod 40 constituting the drive unit 24 is displaced, guidance can be performed within a wider range, accompanied by enabling more stable displacement of the piston rod 40 along the axial direction.

Still further, because two pairs of penetrating holes 108 are formed perpendicular to the direction of extension of the rod holes 96a, 96b, with threaded portions 108a being formed therein at lower portions of the penetrating holes 108, in a state in which the guide unit 26 is mounted on another material P, connecting bolts 109 are tightened into the threaded portions 108a of the penetrating holes 108, and by being tightened against the other material P, the guide unit 26 can be secured reliably and firmly with respect to the other material P.

More specifically, because the guide unit 26 is affixed directly to the other material P, loads and shocks are applied only to the guide unit 26, and direct application of such loads and shocks to the drive unit 24 can be avoided. Additionally, in the case of damage to the guide unit 26, such damage can be responded to simply by replacing only the guide unit 26.

Further, in a state in which the guide unit 26 is affixed as is to the other material P, only the drive unit 24 is capable of being exchanged.

Figure 8:
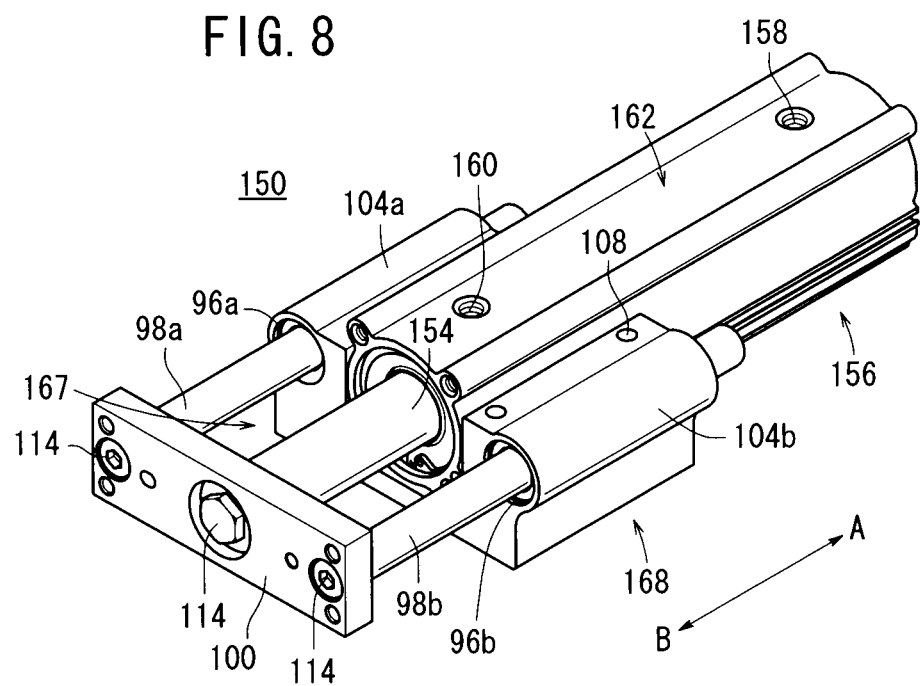
FIG. 8 is an exterior perspective view showing an actuator according to a second embodiment of the present invention.
Figure 9:
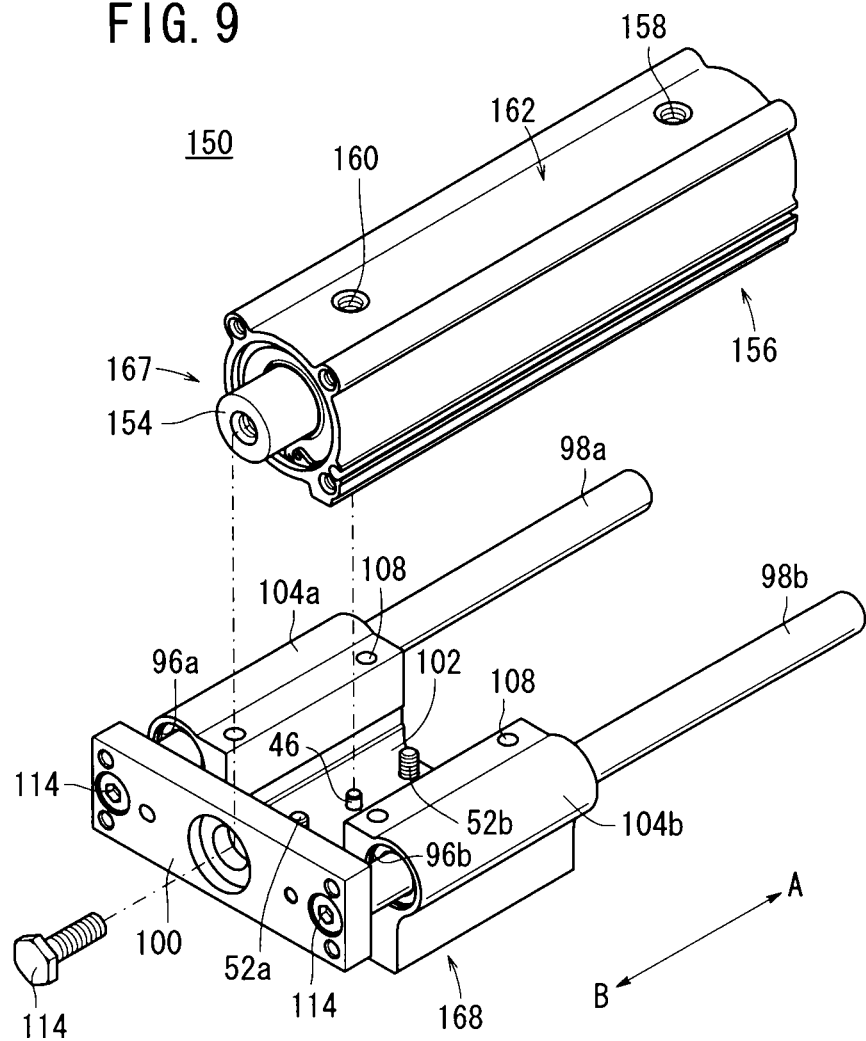
FIG. 9 is an exploded perspective view showing a condition in which a guide unit is detached and separated from the actuator of FIG. 8.
Figure 10:
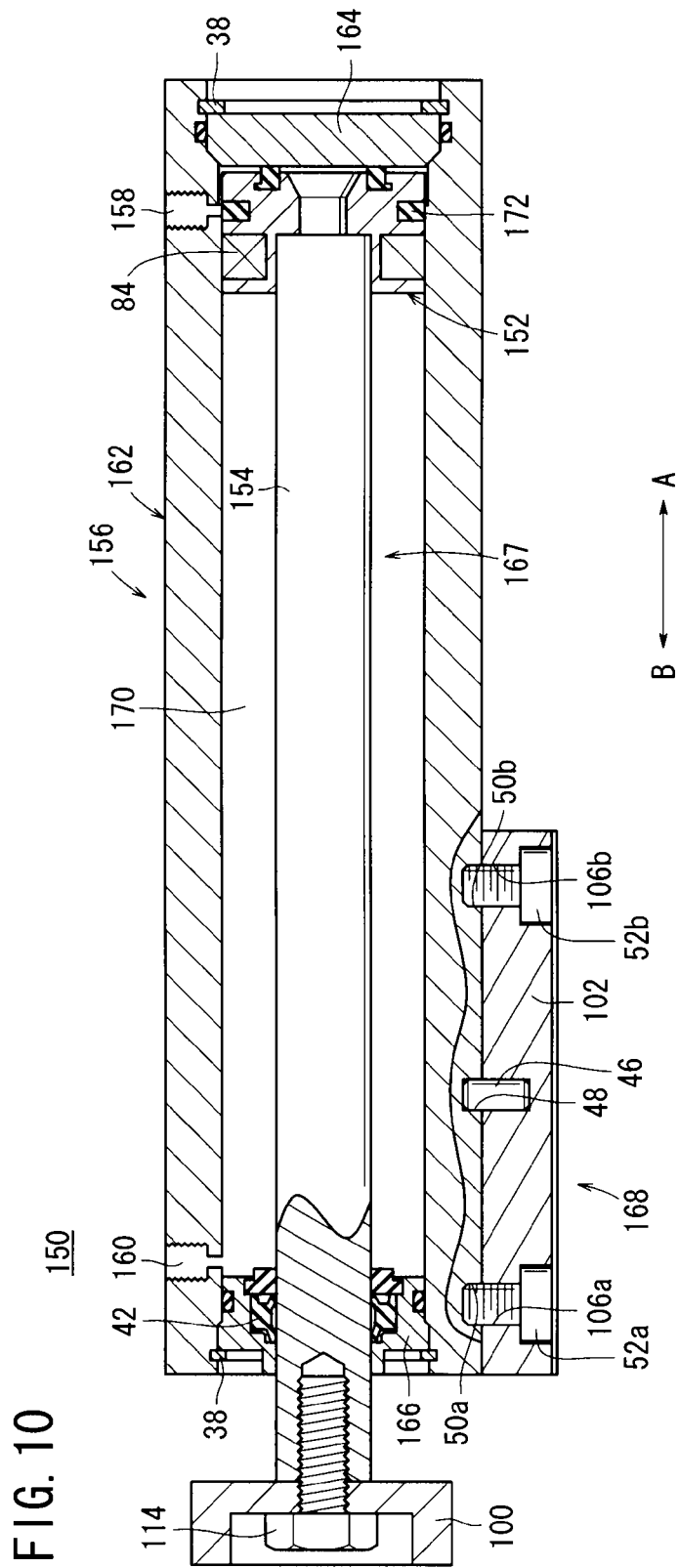
FIG. 10 is an overall vertical cross sectional view of the actuator shown in FIG. 8.

Next, an actuator 150 according to a second embodiment is shown in FIGS. 8 through 10. Structural elements thereof, which are the same as those of the actuator 10 according to the aforementioned first embodiment, are designated by the same reference characters, and detailed descriptions of such features have been omitted.

The actuator 150 according to the second embodiment differs from the actuator 10 according to the first embodiment in that, in place of the drive unit 24, in which the piston 58 and the piston rod 40 are displaced by a driving force of the driving section 16 which is driven by supply of electricity thereto, a fluid pressure cylinder is used as a drive unit 156, in which a pressure fluid is supplied to a cylinder body (body) 162, and a piston (displaceable body) 152 and a piston rod (displaceable body) 154 are displaced by means of a pressing force of the pressure fluid.

As shown in FIGS. 8 through 10, the actuator 150 is equipped with the drive unit 156 made up from a cylinder body 162 having first and second ports (ports) 158, 160 through which a pressure fluid is supplied and discharged, a head cover 164 that closes and seals one end of the cylinder body 162, and a rod cover 166 disposed on the other end of the cylinder body 162, and which supports a piston rod 154 in a displaceable manner. On the other end of the cylinder body 162 that constitutes the drive unit 156, a guide unit (guide mechanism) 168 is provided, which enables a displacement mechanism 167 including the piston rod 154 to be guided along the axial direction (in the direction of arrows A and B).

On an outer circumferential surface of the cylinder body 162, a first port 158 is formed on one end side, and a second port 160 is formed on the other end side of the cylinder body 162, which are connected respectively with a cylinder chamber 170 formed in the interior of the cylinder body 162. The first and second ports 158, 160 are connected via non-illustrated piping to a directional control valve and a pressure fluid supply source.

The head cover 164 is fixed to one end of the cylinder body 162 by a stop ring 38 for thereby blocking the end of the cylinder chamber 170. The rod cover 166 is fixed to the other end of the cylinder body 162 similarly by a stop ring 38. Moreover, a rod packing 42 is installed on the inner circumferential surface of the rod cover 166, such that by sliding contact with the outer circumferential surface of the piston rod 154, an airtight condition in the interior of the cylinder chamber 170 is maintained.

A piston 152, to which one end of the piston rod 154 is connected, is slidably disposed in the cylinder chamber 170. A piston packing 172 and a magnet 84 are installed via an annular groove on the outer circumferential surface of the piston 152. By sliding contact of the piston packing 172 on the inner circumferential surface of the cylinder chamber 170, airtightness in the interior of the cylinder chamber 170 is retained.

The guide body 94 that makes up the guide unit 168 is installed on the other end of the cylinder body 162 through a pair of positioning pins 46 and two pairs of attachment bolts 52a, 52b. Further, a connecting plate 100 is connected to an end of the piston rod 154 that projects outwardly from the cylinder body 162, whereas the pair of guide rods 98a, 98b that make up the guide unit 168 are connected respectively to opposite end sides of the connecting plate 100.

In addition, for example, by supplying a pressure fluid to the first port 158 from the pressure fluid supply source, the pressure fluid is introduced to the interior of the cylinder chamber 170, and the piston 152 is pressed toward the other end side (in the direction of the arrow B) of the cylinder body 162. Owing thereto, the piston rod 154 is displaced along the cylinder body 162 together with the piston 152 by a given stroke in the axial direction. At this time, because the piston rod 154 is guided in a straight line by means of the pair of guide rods 98a, 98b, which are disposed in parallel in the horizontal direction, displacement can be carried out with high precision while the piston rod 154 is maintained in a stable condition. Further, at the same time, because the piston rod 154 is connected mutually with the guide rods 98a, 98b via the connecting plate 100, strength and rigidity thereof can be enhanced, and displacement can be carried out with greater stability.

The present invention is not limited to the aforementioned embodiments, and it goes without saying that various modified or additional structures could be adopted therein without deviating from the essence and gist of the present invention as set forth in the appended claims.

What is claimed is:

1. An actuator comprising:
    a body;
    a displacement mechanism having a displaceable body, which is disposed in the body for displacement along an axial direction of the body; and
    a guide mechanism having a main body portion attached to the body, a guide shaft, which is disposed substantially in parallel with the displaceable body, and which is supported displaceably along the axial direction with respect to the main body portion, and a connecting member that interconnects the guide shaft and the displaceable body,
    wherein the guide mechanism is disposed detachably with respect to the body,
    wherein the main body portion of the guide mechanism includes a recess in which the body is installed, and
    wherein the main body portion of the guide mechanism includes at least one positioning pin that projects into the recess for engagement with a respective at least one aperture of the body to carry out positioning of the main body portion with respect to the body.

2. The actuator according to claim 1, wherein the guide shaft comprises a pair of guide shafts, which are separated an equal distance centrally about the displaceable body.

3. The actuator according to claim 1, wherein when the body is positioned within the recess of the guide mechanism, the displaceable body and the guide shaft are arranged in parallel along a horizontal direction at substantially the same height.

4. The actuator according to claim 1, wherein the main body portion comprises a penetrating hole that penetrates in a direction perpendicular to an axis of the guide shaft, and wherein a threaded portion for screw-engagement of a tightening member is formed in the penetrating hole.

5. The actuator according to claim 1, wherein the main body portion comprises a support hole that penetrates substantially in parallel with the displacement body, the support hole guiding the guide shaft displaceably along an axial direction.

6. The actuator according to claim 1, wherein the actuator comprises a driving section disposed on the body and which is driven upon supply of electricity thereto, and a transmission mechanism for transmitting a drive force of the driving section to the displaceable body, the displaceable body being displaced by the drive force.

7. The actuator according to claim 1, wherein the actuator comprises ports formed in the body through which a pressure fluid is supplied and discharged, and the displaceable body, which is arranged in the interior of the body, wherein the displaceable body is displaced by supplying the pressure fluid to the interior of the body.

* * * * *